June 28, 1966 D. E. CARRUTH ET AL 3,258,677

MAGNETOSTRICTION DELAY LINE FREQUENCY DIVIDER WITH RECIRCULATING LOOPS

Filed Nov. 8, 1961

| | 7 | BIT 1 | BIT 2 | BIT 3 | | BIT n-2 | BIT n-1 | BIT n | 9 | FF Y | FF X |
|---|---|---|---|---|---|---|---|---|---|---|---|
| START PULSE → a | C | P | 0 | 0 | | 0 | 0 | 0 | 0 | 1 | 0 |
| b | 0 | C | P | 0 | | 0 | 0 | 0 | 0 | 1 | 0 |
| c | 0 | 0 | 0 | 0 | | 0 | C | P | | 1 | 0 |
| d | 0 | P | 0 | 0 | | 0 | 0 | C | P | 0 | 0 |
| e | 0 | 0 | P | 0 | | 0 | 0 | 0 | C | 1 | 1 |
| f | 0 | C | 0 | P | | 0 | 0 | 0 | 0 | 1 | 0 |
| g | 0 | C | 0 | 0 | | 0 | 0 | P | 0 | 1 | 0 |
| h | 0 | P | C | 0 | | 0 | 0 | 0 | P | 0 | 0 |
| i | 0 | 0 | P | C | | 0 | 0 | 0 | 0 | 0 | 1 |
| j | 0 | 0 | 0 | P | | 0 | 0 | 0 | 0 | 0 | 1 |
| k | 0 | 0 | 0 | 0 | | 0 | P | C | | 0 | 1 |
| l | 0 | 0 | 0 | 0 | | 0 | 0 | P | C | 1 | 1 |
| READ OUT ← m | C | P | 0 | 0 | | 0 | 0 | 0 | P | 1 | 1 |
| n | 0 | C | P | 0 | | 0 | 0 | 0 | 0 | 1 | 0 |

DONALD E. CARRUTH
GORDON D. SMITH, Jr.
INVENTORS

BY W. O. Quesenberry
Claude Funkhouser

ATTORNEYS

United States Patent Office 3,258,677
Patented June 28, 1966

3,258,677

MAGNETOSTRICTION DELAY LINE FREQUENCY DIVIDER WITH RECIRCULATING LOOPS

Donald E. Carruth, Silver Spring, and Gordon D. Smith, Jr., Olney, Md., assignors to the United States of America as represented by the Secretary of the Navy Filed Nov. 8, 1961, Ser. No. 151,116
7 Claims. (Cl. 321—60)

The present invention relates generally to frequency dividers and more specifically to a system for generating from a range of input clock frequencies one given output frequency, which is a submultiple of one of said clock frequencies.

Many circuits have been developed for accomplishing frequency division; however, these circuits have a very high parts count and as a result are quite expensive. In addition, some of the these circuits, such as the magnetic core circuits, have a rather low frequency limit.

The instant invention is characterized by its simplicity, low parts count, and ability to handle relatively high frequencies. The invention centers about the use of a magnetostriction delay line with appropriate gating circuits.

It is thus an object of the instant invention to provide a frequency divider which will generate from a range of input clock frequencies a single predetermined output frequency.

It is still another object of the invention to provide a frequency divider which will operate on any signal of frequency up to one megacycle.

A further object of the invention is to provide a frequency divider which is characterized by a low parts count and high speed of response.

Other objects and many of the attendant advantages of this invention will be readily appreciated as the same becomes better understood by reference to the following detailed description when considered in connection with the accompanying drawings, wherein:

FIG. 1 is a block diagram of the frequency divider embodying the instant invention. Numerous circuit designs exist which will perform the functions indicated by the individual components.

Figures 1, 2:
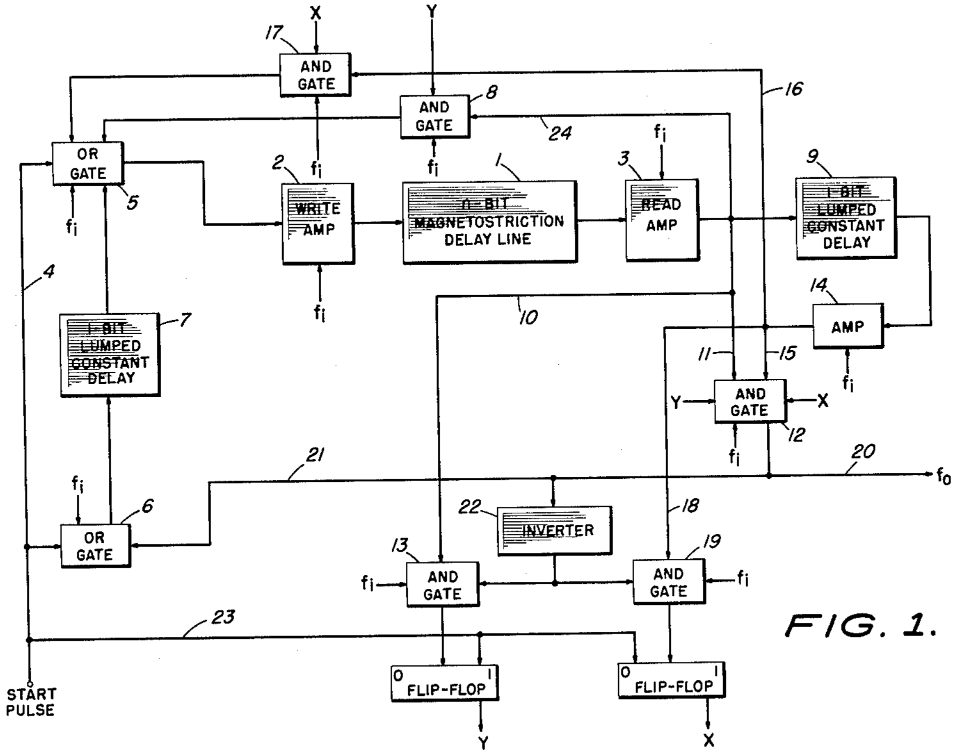
FIG. 1 is a schematic diagram of a frequency divider constructed according to the invention.
FIG. 2 is a schedule of the operating conditions of the invention for one cycle of operation.

The main component of the combination is a magnetostriction delay line of the torsional mode variety indicated at 1. The delay line has the necessary write amplifier 2 at its input and read amplifier 3 at its output to apply to and remove information from the line. Start pulses for initiating operation of the system are applied to the delay line 1 by way of line 4 and "or" gate 5, through write amplifier 2. These same start pulses travel to "or" gate 5 by a devious route through "or" gate 6 and one-bit lumped constant delay 7. The output of the read amplifier 3 is connected on the one hand by way of line 24 through "and" gate 8 to input "or" gate 5 and on the other hand to one-bit lumped constant delay 9. This output is also connected by way of line 11 to output "and" gate 12 and by way of line 10 to "and" gate 13. The output of one-bit delay 9 is connected through amplifier 14 to input 15 of "and" gate 12 and by way of line 16 to "and" gate 17 whose output is connected to input gate 5. The output of amplifier 14 is also applied by way of line 18 to "and" gate 19. Signals from lines 10 and 18 through "and" gates 13 and 19 trigger a pair of flip-flops indicated as X and Y. The output of flip-flop X is connected to gates 12 and 17, and the output of flip-flop Y is connected to gates 8 and 12 so as to control the operation of these gates as hereinafter described.

The output of this system is taken from line 20. This output pulse is also applied by way of line 21 to "or" gate 6 in order to initiate a new cycle of operation, and is applied through an inverter 22 to "and" gates 13 and 19 to reset the flip-flops X and Y at the end of each complete cycle of operation. The flip-flops are set initially by the start pulse which travels to these components through line 23. The input clock signal to be divided ($f_i$) is applied to and synchronizes the operation of each gate and amplifier in the circuit.

The magnetostriction delay line is assumed initially to contain all "zeroes." To insure that this is the case, the output of the line can be shorted to ground for a time equal to the delay time of the line. The start pulse line 4 is then activated with a suitable pulse, which may be derived from a common single pulse generator and which places a single "one" in the magnetostriction delay line. This same pulse actuates the one-bit delay 7, so that one bit-time later, a second pulse is writen into the magnetostriction delay line. The first pulse written into the line will be called the "P" or precessing pulse and the second, adjacent pulse will be called the "C" or circulating pulse.

The two flip-flops X and Y control the recirculation of the P and C pulses. If both X and Y are in state 1, a pulse is recirculated from the one-bit delay line 9. If, however, either X or Y are in state 0, no pulses is recirculated from delay 9. A pulse being recirculated through either path 16 or 24 triggers (changes the state) of the corresponding flip-flop.

FIG. 2 gives a schedule of operation of the divider shown in FIG. 1. The first line (*a*) of the chart shows the P pulse in bit 1 of the magnetostriction delay line and the C pulse in delay 7. From this point on, the P and C pulses travel together through the *n*-bits of the delay line 1. When P reaches the end of the delay line 1, it passes to "and" gate 8 and to the one-bit delay 9. Line (*d*) of the schedule shows this condition. Since flip-flop Y is in state 1, the pulse P will pass through "and" gate 8 to "or" gate 5 and the beginning of the magnetostriction delay line. P also passes along line 10 to trigger flip-flop Y to the 0 state. During the next bit of time the P pulse emerges from one-bit delay 9 but will not pass through "and" gates 12 or 17 since the flip-flop X is in the 0 state. The pulse P will however trigger flip-flop X to the 1 state through line 18 and gate 19. At this time C moves on to the one-bit delay 9 but is prevented from passing through gates 8 or 12 because flip-flop Y is in the 0 state. C also passes along line 10 to trigger Y to the 1 state. Both X and Y are now in the 1 state; therefore, during the next bit time, C will pass through "and" gate 17 but not through "and" gate 12 because input 11 to this gate is not activated. This pulse also passes through line 18 to trigger flip-flop X to the 0 state.

It is thus seen that P recirculates after traveling only the *n* bits of the magnetostriction delay line 1, whereas, C travels through the extra one bit-time delay 9 before recirculating. This has the effect of separating P and C by one bit-time, with a "zero" filling in the space in the line between P and C.

This process continues with an additional "zero" being interposed between P and C each time P recirculates through the $n$ bits of the line 1. Finally, C lags so far behind P that the two pulses change order in the line, i.e., instead of the order CP (as the pulses were initially inserted in the magnetostriction delay line) they assume the order PC. This state is indicated by lines ($k$) and ($l$) of the chart in FIG. 2. Now, when pulse C leaves the delay line 1 and passes to one-bit delay 9, it triggers flip-flop Y to the 1 state. Both flip-flops are now in the 1 state. Upon emerging from one-bit delay 9, pulse C is applied to "and" gate 12. The time all inputs to the gate are activated since pulse P (immediately behind pulse P) now activates input 11. Consequently pulse C passes through "and" gate 12 to the ouput 20.

The pulses P and C are then reinserted in the line as they originally were and the process begins again. The entire process takes place once in each $n^2$ bit times where $n$ is the number of bits that the delay line 1 will hold for a given clock frequency. It must also be remembered that because the input signal to be divided is applied to each gate and amplifier in the system, all changes of state of the logical devices occur because of and in synchronism with this signal.

Strictly speaking, the invention is not a true frequency divider in every sense of the term. It will not take any of the permissible input clock frequencies and divide them by the number $n^2$. Rather, the invention is characterized by the maintenance of a given output frequency regardless of which of the given input clock frequencies is used. However, the derived ouput frequency will be a submultiple of one given input clock frequency because of the way in which the delay times of lumped constant delays 7 and 9 are determined. The particular output frequency derived is directly related to the determined amount of one-bit time which is equal to the reciprocal of the selected clock frequency $f_1$. With the delay lines 7 and 9 set to a delay of $1/f_1$, the output frequency on line 20 will be fixed at $f_o=f_1/n^2$ regardless of changes in the applied clock frequency.

Obviously, many modifications and variations of the present invention are possible in the light of the above teachings. It is therefore to be understood that within the scope of the appended claims the invention may be practiced otherwise than as specifically described.

What is claimed is:

1. A delay line divider comprising:
(a) a magnetostriction delay line,
(b) means for applying a pair of input pulses to said delay line in consecutive order,
(c) a one-bit delay line connected to the output of said magnetostriction delay line,
(d) a first feedback path between the output and input of said magnetostriction delay line,
(e) a second feedback path from the output of said one-bit delay line to the input of said magnetostriction delay line,
(f) gating means provided in each feedback path for controlling said paths,
(g) a first flip-flop connected to the output of said magnetostriction delay line for operating the gate in said first feedback path,
(h) a second flip-flop connected to the output of said one-bit delay line for operating the gate in said second feedback path, and
(i) an "and" gate connected to the output of both delay lines and to each of said flip-flops adapted to be operably controlled by both flip-flops so as to provide a signal output only when said pair of input pulses have recirculated a predetermined number of times.

2. A delay line divider comprising:
(a) a magnetostriction delay line, (b) an input circuit consisting of a first "or" gate in series with a first one-bit delay line connected to the input of the magnetostriction delay line via a second "or" gate,
(c) a second one-bit delay line connected to the output of said magnetostriction delay line,
(d) a first feedback path between the output and the input of said magnetostriction delay line,
(e) a second feedback path from the output of said second one-bit delay line to the input of said magnetostriction delay line,
(f) an "and" gate in each of said feedback paths,
(g) a first binary flip-flop operably connected to and controlled by the output of said magnetostriction delay line for operating the "and" gate in said first feedback path,
(h) a second binary flip-flop controlled by the output of said second one-bit delay line for operating the "and" gate in said second feedback path,
(i) signal means for applying a signal of predetermined frequency to each gate, and
(j) an "and" gate connected to the output of both delay lines and controlled by both flip-flops so as to provide a signal output only when said pair of input pulses have recirculated a predetermined number of times.

3. A delay line divider for generating a sub-multiple of a clock frequency comprising,
(a) a first delay line of fixed length,
(b) means for applying a pair of input pulses to said first delay line in consecutive order,
(c) a first one-bit delay line connected to the output of said first delay line for delaying one of said pair of pulses with respect to the other,
(d) a separated feedback path from the output of each delay line to the input of said first delay line for recirculating the pulses in said delay lines,
(e) control means operably connected to each of said feedback paths for controlling the passage of pulses in said feedback paths so as to effect processing of the pulses in said delay lines,
(f) gating means connected to the outputs of both delay lines for allowing passage of a signal only after said input pulses have recirculated a predetermined number of times, and
(g) means for applying an input clock frequency to said control means so as to synchronize the operation thereof.

4. A delay line divider for generating a sub-multiple of a clock frequency as defined in claim 3, wherein,
(a) said first one-bit delay line has a fixed time delay equal to the reciprocal of said input clock frequency.

5. A delay line divider for generating a sub-multiple of a clock frequency as defined in claim 3, wherein,
(a) said means for applying a pair of input pulses to said first delay line consists of a first "or" gate in series with a second one-bit delay line connected to the input of said first delay line of fixed length via a second "or" gate and means for applying a single start pulse to both of said "or" gates.

6. A delay line divider for generating a sub-multiple of a clock frequency as defined in claim 5, wherein,
(a) said second one-bit delay line has a fixed time delay equal to the reciprocal of said input clock frequency.

7. A delay line divider for generating a sub-multiple of a clock frequency as defined in claim 3, wherein,
(a) said control means comprises an "and" gate in each feedback path and a pair of flip-flops each operably connected to one of said "and" gates for controlling the opening and closing thereof, and
(b) said gating means comprises an output control "and" gate and a pair of flip-flop control "and" gates each operably connected to the outputs of said first delay line of fixed length and said first one-bit delay line, each of said flip-flop control "and" gates being individually connected to one of said pair of flip-flops in said feedback paths for controlling the recirculation of pulses in said delay lines, said flip-flops being operably connected to said output control "and" gate for controlling the operation of said output control "and" gate so that an output is derived from said output control "and" gate only after said pulses in said delay lines have recirculated a predetermined number of times.

References Cited by the Examiner

UNITED STATES PATENTS

| | | | |
|---|---|---|---|
| 2,827,566 | 3/1958 | Lubkin | 307—88.5 |
| 2,888,557 | 5/1959 | Schneider | 307—88.5 |
| 3,150,324 | 9/1964 | Hallden et al. | 307—88.5 |

FOREIGN PATENTS

| | | |
|---|---|---|
| 868,854 | 5/1961 | Great Britain. |

LLOYD McCOLLUM, *Primary Examiner.*

G. J. BUDOCK, G. GOLDBERG, *Assistant Examiners.*